(12) United States Patent
Hastings et al.

(10) Patent No.: US 7,216,108 B2
(45) Date of Patent: May 8, 2007

(54) TRANSFERABLE METER LICENSES USING SMARTCARD TECHNOLOGY

(75) Inventors: Mark Alan Hastings, Seneca, SC (US); Ralph Mannis, Central, SC (US)

(73) Assignee: Itron, Inc., Liberty Lake, WA (US)

( * ) Notice: Subject to any disclaimer, the term of this patent is extended or adjusted under 35 U.S.C. 154(b) by 439 days.

(21) Appl. No.: 10/218,696

(22) Filed: Aug. 14, 2002

(65) Prior Publication Data

US 2004/0034603 A1 Feb. 19, 2004

(51) Int. Cl.
*G06F 15/20* (2006.01)
(52) U.S. Cl. .................... 705/63; 705/1; 705/400; 705/410; 705/411; 364/483; 395/186; 324/142
(58) Field of Classification Search .............. 705/1, 705/63, 401; 324/142; 380/870
See application file for complete search history.

(56) References Cited

U.S. PATENT DOCUMENTS

| 4,791,362 | A | | 12/1988 | Philpot | |
|---|---|---|---|---|---|
| 5,715,390 | A | * | 2/1998 | Hoffman et al. | 713/202 |
| 5,742,512 | A | * | 4/1998 | Edge et al. | 702/57 |
| 6,118,986 | A | | 9/2000 | Harris et al. | |
| 6,164,531 | A | | 12/2000 | Harris et al. | |
| 6,278,783 | B1 | * | 8/2001 | Kocher et al. | 380/277 |
| 6,591,229 | B1 | * | 7/2003 | Pattinson et al. | 702/189 |
| 2002/0138754 | A1 | * | 9/2002 | Himeno | 713/200 |
| 2003/0154471 | A1 | * | 8/2003 | Teachman et al. | 717/171 |

FOREIGN PATENT DOCUMENTS

WO WO 9915947 * 4/1999

OTHER PUBLICATIONS

EnergyCite Product Summary EMS 2020 date, author unknown.*

* cited by examiner

*Primary Examiner*—Pierre E. Elisca
*Assistant Examiner*—John M. Winter
(74) *Attorney, Agent, or Firm*—Dority & Manning, P.A.

(57) ABSTRACT

A metering system is provided including a smartcard reader and peripheral computer in communication with a metering apparatus. A smartcard with memory, microprocessor, and license counter may then be engaged with a smartcard reader in the metering system to effect meter license transactions. The license transactions may be purchased by a user either to enable enhanced functional meter features via a meter upgrade process or to disable functional meter features via a meter downgrade process. Such features are typically enabled or disabled by respectively either providing or restricting access to selected portions of the meter firmware. Since both upgrades and downgrades can be effected at a utility meter, the smartcards provide transferable meter licenses. Advantages of the disclosed smartcard technology facilitate secure and reliable license transactions. Such advantages more particularly result from data encryption techniques when communicating with a smartcard and a random communication protocol implemented between smartcard and utility meter modules.

45 Claims, 6 Drawing Sheets

TRANSFERABLE METER LICENSES USING SMARTCARD TECHNOLOGY

FIELD OF THE INVENTION

The present subject matter generally concerns a system and method for providing transferable meter licenses via smartcard technology, and more particularly relates to the utilization of smartcards to effect the addition, removal, or modification of specific functional features associated with a utility meter via smartcard license transactions.

BACKGROUND OF THE INVENTION

Many varied types of metering devices have been provided worldwide to monitor the distribution of customer utilities at residential and commercial properties. Utility meters may be used to monitor different types of utilities (i.e., products, or commodities) such as water, gas, electricity, cable service, telecommunications, and others. Such utility meters are also often characterized by different functionality and specific performance capabilities.

A utility meter is typically equipped with all the hardware components needed to operate in a variety of fashions and with a multitude of optional features. Thus, a microprocessor-based utility meter generally corresponds to a multi-purpose metering platform. The functionality provided by each particular meter is governed in a substantial fashion by the firmware embedded in the meter. The meter firmware corresponds to the software stored in various memory chips or other components in the meter hardware that enables other software instructions and applications to be read and executed. New firmware can be downloaded to a utility meter to add, remove, or modify the functionality of a meter.

Many existing utility meters are configured such that a user can upgrade a meter's functionality by downloading new firmware to the meter. The enablement of such firmware at a meter is often referenced as uploading and downloading keys in the meter. These meter keys unlock certain features and/or capabilities of the meter and enable meter operation in a selected fashion.

Meter key access is typically enabled via licenses that may be purchased by a user. Different licenses may be available for each type of functionality that can be added to a meter. A license for a function gives a user the ability to add that functionality to a meter, at which point the license is considered used.

Known technology for upgrading meter functionality involves the purchase of upgrade licenses and corresponding applications that are provided on diskette storage device(s). Such disk(s) provide information that enables a user to access new firmware on a meter thus increasing particular functionality for a meter. Such disks may also maintain a license count such that the number of upgrades can be monitored. This license count feature intends to ensure the number of upgrades downloaded to a meter matches the number of purchased licenses. The use of license and upgrade applications via diskette can be relatively insecure and may often pose usability problems both to the manufacturer or distributor and to the user.

Additional known technology makes use of dongles, or security connectors with specialized internal chips, that must be connected to an I/O port of a meter device in order for certain features or meter functionality to run properly. These peripheral adapters are also prone to problematic security issues, and may thus not be desirable for certain applications.

New advances in metering technology have and will significantly increase the number of options and functional features available for a utility meter. Each upgrade can range in cost from several hundred dollars to several thousand dollars or more. Given the increase in functional options that utility meters are afforded, it is desired to provide improved features and methods for administering and managing the deployment of licensed meter functionality upgrades. It is also preferred to provide such technology with an ability to ensure effective functionality transfer and secure license transactions.

While various systems and methods have been developed to address meter upgrades and corresponding license transactions, no one design has emerged that generally encompasses all of the desired characteristics as hereafter presented in accordance with the subject technology.

BRIEF SUMMARY OF THE INVENTION

In view of the discussed drawbacks and shortcomings encountered in the field of utility metering and upgrade feature licenses, an improved system and method for providing transferable meter licenses has been developed. Thus, broadly speaking, a general object of the present subject matter is to provide smartcard technology that enables meter license transfers and an ability to upgrade and/or downgrade functionality to a utility meter. The term smartcard as used herein is intended to generally represent devices as generically referenced as smart cards and associated technology as recognized in data storage, transactional and other applications.

It is another principal object of the present subject matter to provide technology that effects meter functionality via licenses that may be purchased from a meter manufacturer or license distributor. Such meter licenses can be used to enable or disable firmware previously installed on a meter. Alternatively, the meter licenses can be used to add new firmware or remove and/or modify existing firmware on a meter, thus providing an ability to reprogram a given meter configuration.

Yet another principal object of the present technology is to implement meter licenses via smartcard technology. A smartcard is preferably provided with memory, microprocessor, and counter to manage the number of licenses purchased by a user from a meter manufacturer or license distributor. The smartcard microprocessor allows for direct connection and communication between the smartcard reader and a communication port at the meter.

Another object of the present subject matter is to provide a secure method for implementing meter license transactions. The utilization of smartcards aids this objective due to a wide variety of cryptography features, such as user identification via Personal Identification Number (PIN) input. Secure meter transactions are also facilitated by a random communication protocol employed when transferring meter license information. Such communication protocol helps prevent license theft as well as potential license count errors (e.g., as could be caused during power outages to a meter during a license transaction.)

A still further object of the present technology is to provide transferable meter licenses such that a smartcard can be used to either upload licensed features from a meter or download licensed features to a meter. With such transferable license capability, a given meter license may be downloaded to one utility meter, uploaded from that utility meter at a later date, and then downloaded to a different utility meter.

A resultant advantage of the presently disclosed technology is that meter manufacturers, license distributors, utility providers and end consumers can also utilize the subject smartcard technology to manage meter inventory and licensed features thereof.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the subject technology without departing from the spirit and scope thereof, by virtue of present reference thereto. Such variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of this technology may include various combinations or configurations of presently disclosed features or elements, or their equivalents (including combinations of features, parts, or steps or configurations thereof not expressly shown in the figures or stated in the detailed description of such figures). One exemplary such embodiment of the present subject matter relates to a smartcard for use with utility meter license transactions, wherein the smartcard preferably comprises memory, a microprocessor, an interface port and an enclosure. The memory module may be configured to store files with information corresponding to license transactions and the microprocessor may be configured to process data transferred to and from the meter. The enclosure provides a housing for the smartcard memory and microprocessor components. The interface port (such as a nine-pin electrical connector) is configured to connect and enable communication between the smartcard and a smartcard reader. Such exemplary smartcard embodiment may also include a license counter that maintains a number of licenses available to be upgraded to or downgraded from selected utility meters.

Another present exemplary embodiment of the subject technology concerns a smartcard reader configured to interface with a utility meter and a peripheral computer such that meter license transactions can be effected. Such a smartcard reader preferably includes a plurality of various interface ports for interconnecting components in a metering system. Smartcard reader may include a first interface port configured to connect and communicate with a smartcard, a second interface port configured to communicate with a peripheral computer (PC) and a PC-based application, and a third interface port for connecting the smartcard reader to a utility meter.

Yet another exemplary embodiment of the present technology involves a metering system capable of providing upgraded or downgraded functionality, wherein the functionality is enabled or disabled via meter functionality licenses, and wherein the metering system preferably includes a metering apparatus with at least one communications port, a peripheral computer, and a smartcard reader. The metering apparatus electronically measures or distributes a utility product and includes a communications port such that other components in the metering system (such as the peripheral computer and the smartcard reader) can communicate with the processing components of the metering apparatus. A smartcard may then be utilized in combination with the subject metering system such that transferable license transactions can occur.

Still further embodiments of the disclosed technology relates to methodology associated with the license transactions of the present subject matter. A particular exemplary embodiment of such methodology involves a method of utilizing a smartcard to transfer a functionality license to a utility meter. Such process preferably involves interfacing a smartcard with a utility meter, interrogating a license counter on the smartcard to ensure a proper license count exists before transferring the desired functionality, providing a secure communication path between the smartcard and the utility meter, and transferring information between the smartcard and the meter to enable or disable selected utility meter functions.

The above process and others in accordance with the disclosed technology may be employed both in meter upgrade processes and in meter downgrade processes. Such processes may include steps of providing a smartcard reader interfaced with a utility meter and a peripheral computer, engaging a smartcard into the smartcard reader, activating a PC-based transfer application on the PC, and performing external authentication between the smartcard and the PC. In the case of meter upgrades, communication between the PC and the meter enables selected enhanced meter features and a smartcard license counter is decremented. For meter downgrades, communication between the PC and the meter disables selected enhanced meter features and a smartcard license counter is incremented.

Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
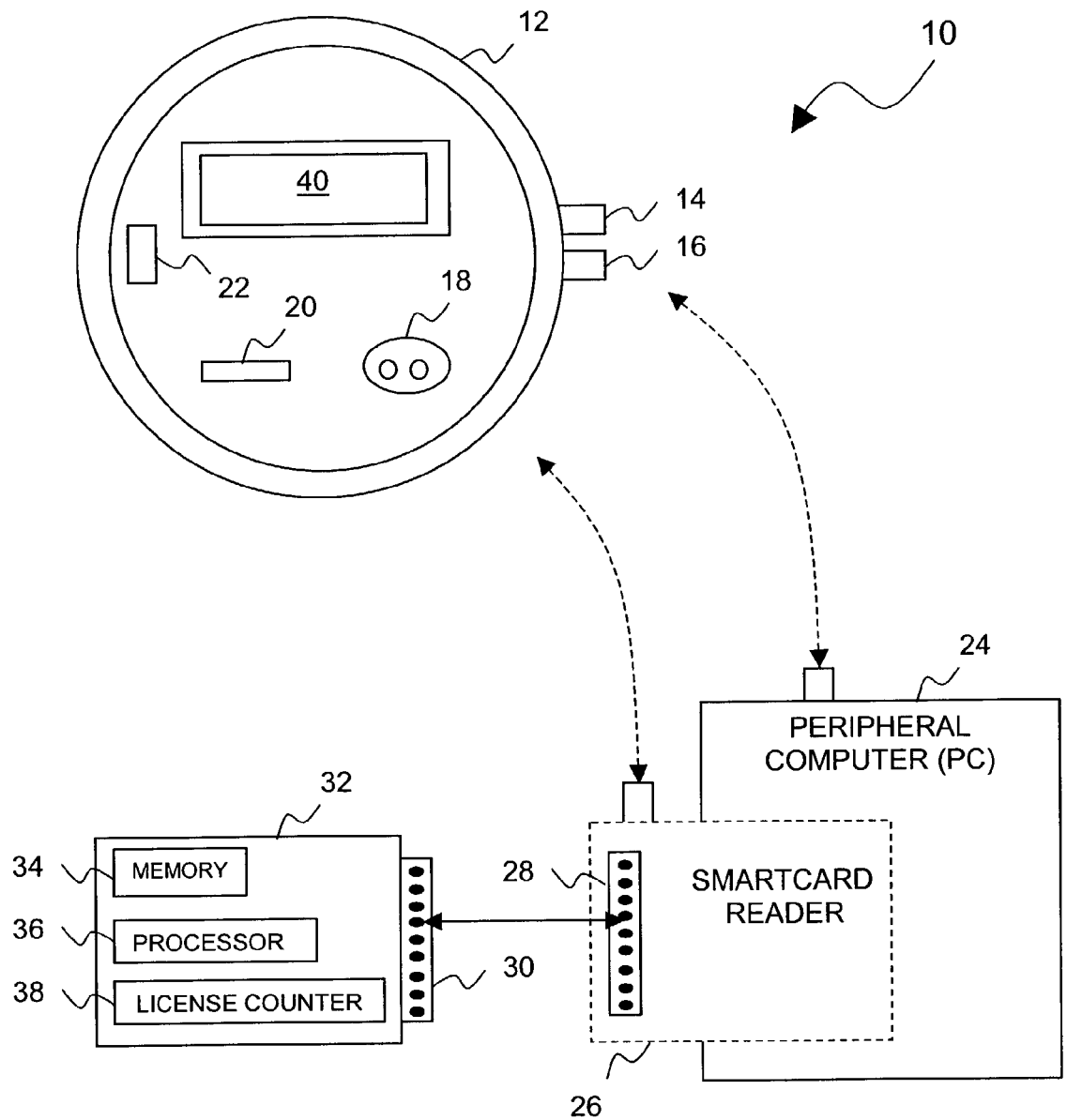
FIG. 1 illustrates an exemplary metering system with interfaced smartcard features in accordance with the present subject matter.

Repeat use of reference characters throughout the present specification and appended drawings is intended to represent same or analogous features or elements of the invention.

DETAILED DESCRIPTION OF THE EMBODIMENTS

As previously discussed, the present subject matter is particularly concerned with providing transferable meter licenses via smartcard technology. More particularly, the disclosed technology relates to the utilization of smartcards and meter licenses to effect the addition, removal, or modification of specific functional features associated with a utility meter.

The disclosed technology enables the use of smartcard technology to upgrade and/or downgrade functional features to a utility meter. Several components of a metering system must typically be present such that this transfer process can take place. These components include conventional metering apparatuses utilized in conjunction with peripheral devices and smartcard features, and will be discussed herein with reference to FIG. 1. Software features utilized in conjunction with such metering system hardware components include a PC-based smartcard license transfer application, as referenced in FIG. 5.

Once a metering system and the required peripheral components are configured in a proper manner, methodology in accordance with the present subject matter can be effected. In general, such methodology relates to a process of utilizing a smartcard to transfer functionality licenses and corresponding meter feature capabilities to a utility meter. Such process will be described herein with reference to FIG. 2.

Figure 2:
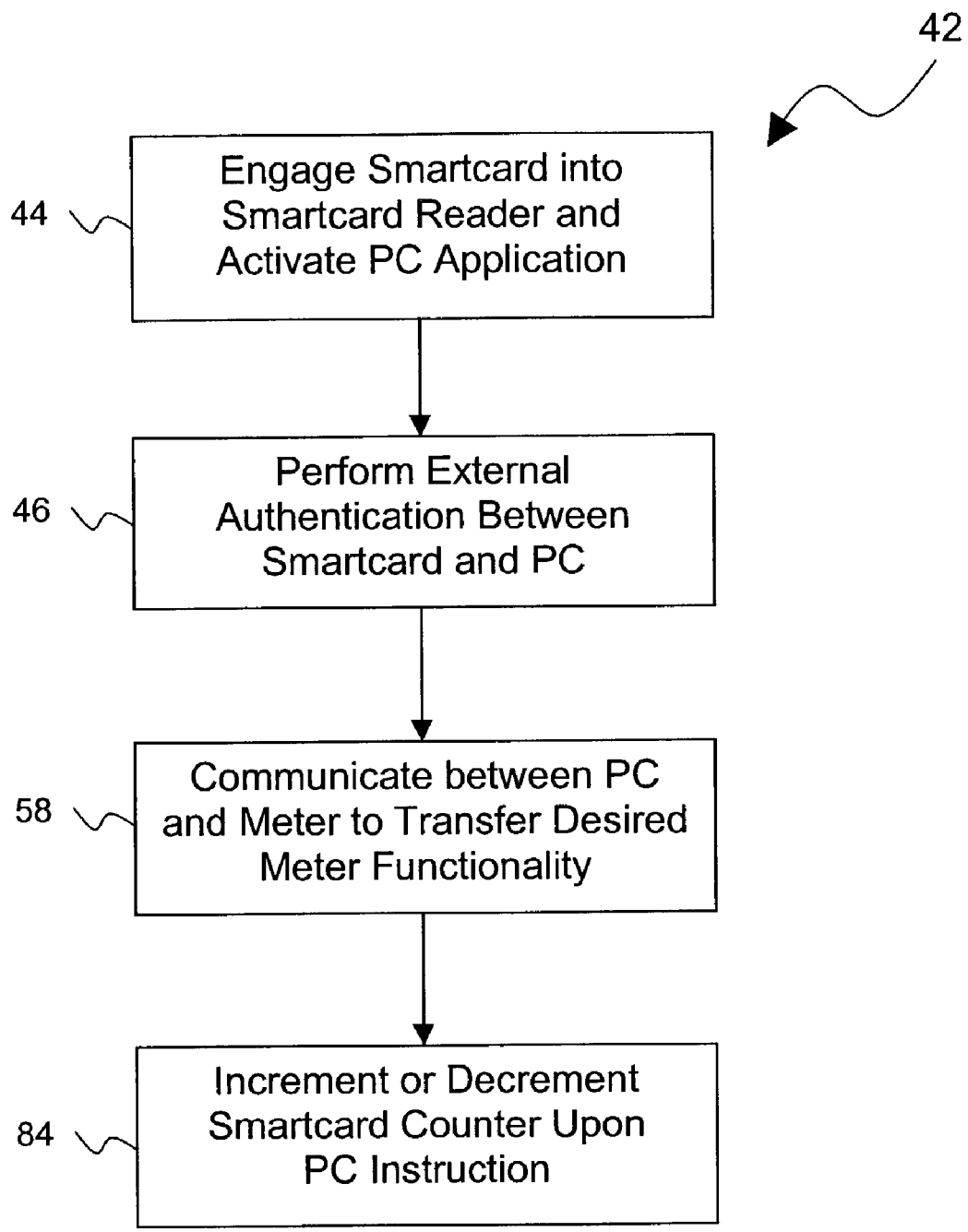
FIG. 2 provides a flow chart representation of an exemplary method of utilizing a smartcard to transfer functionality licenses and corresponding meter feature capabilities to a utility meter in accordance with the presently disclosed technology.
Figure 3:
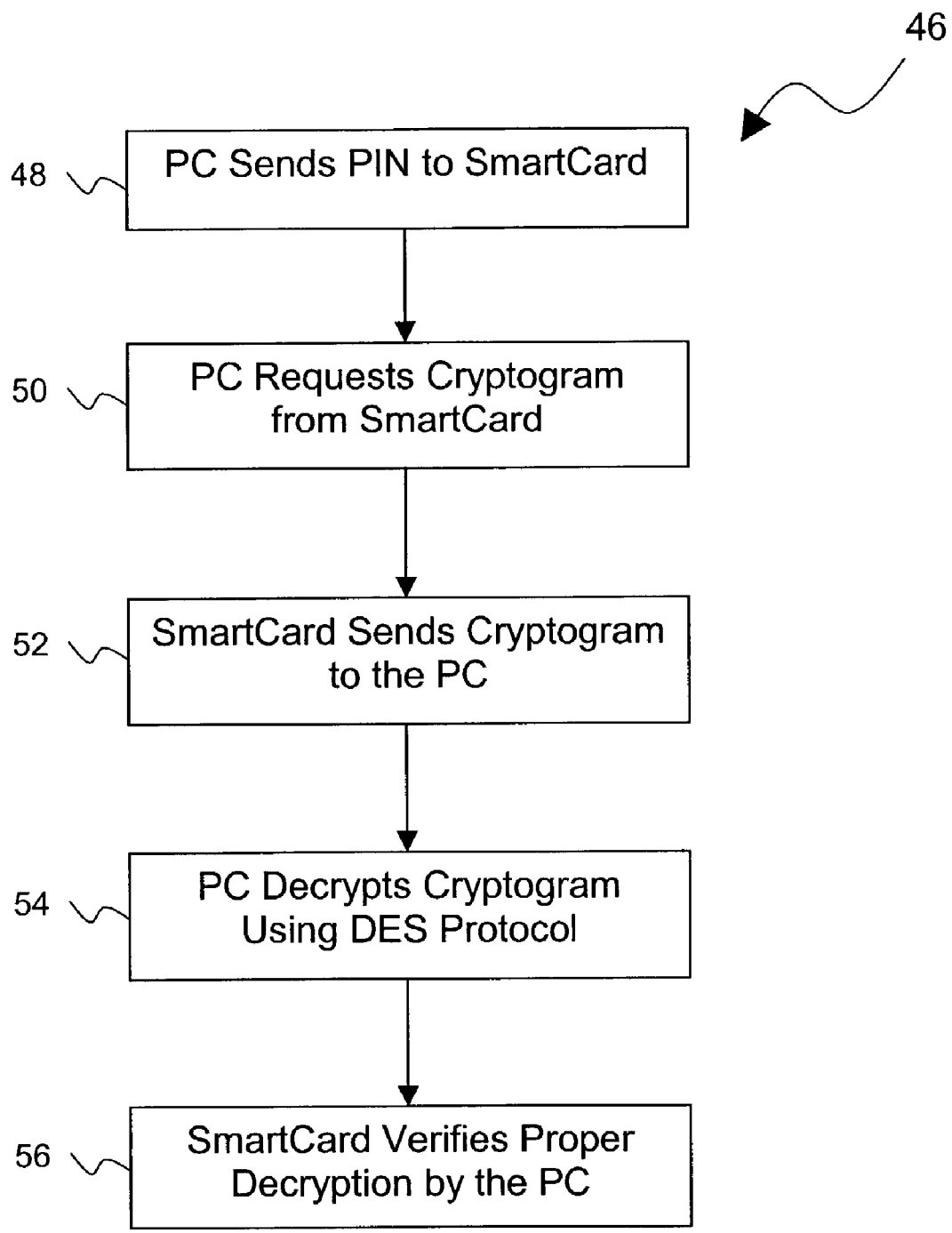
FIG. 3 provides a flow chart representation of exemplary process steps for performing external authentication between a smartcard and peripheral computer in accordance with the present subject matter.
Figure 4A:
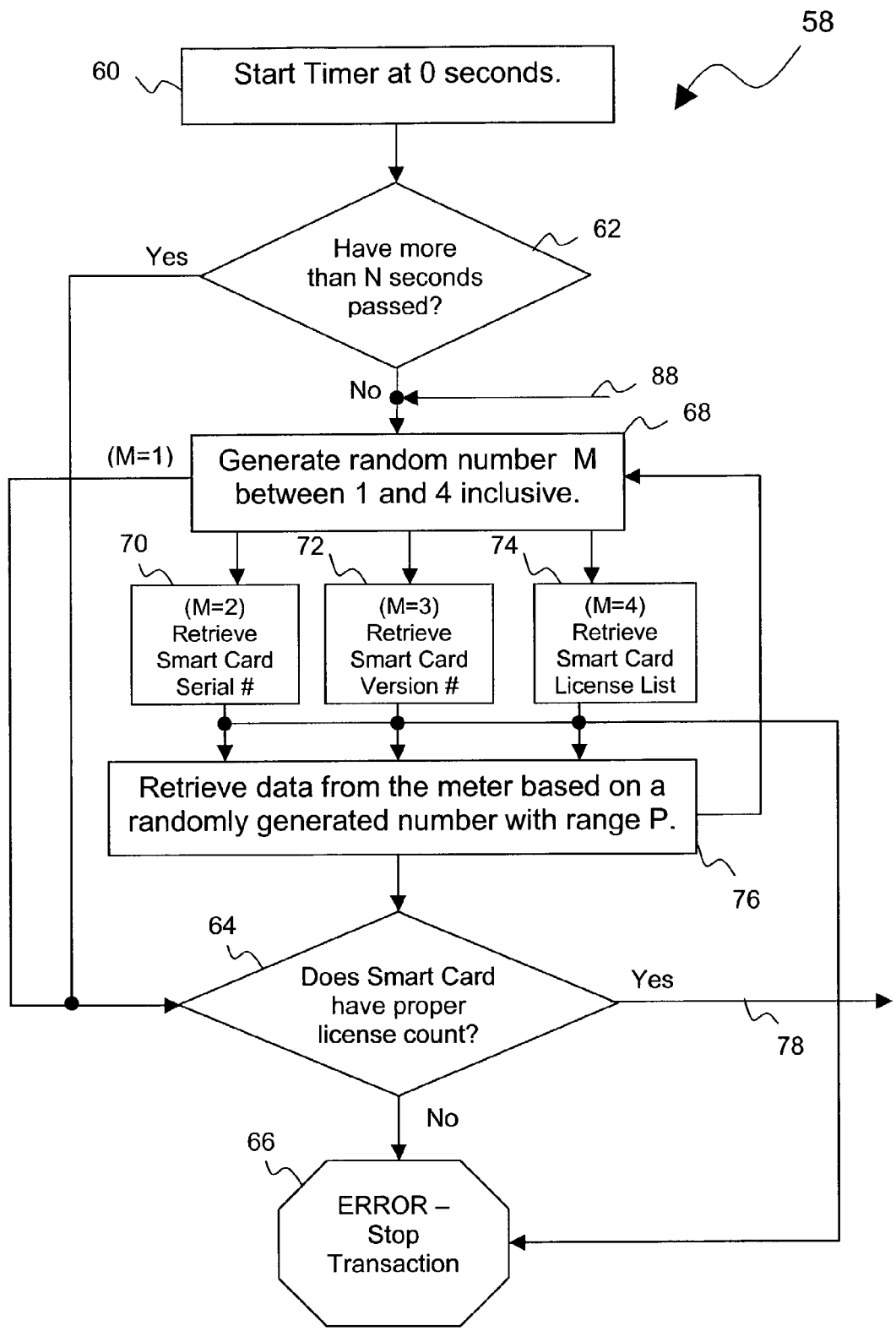
FIGS. 4a and 4b provide a flow chart representation of exemplary process steps for communicating between a peripheral computer and a meter to transfer desired meter functionality.
Figure 4B:
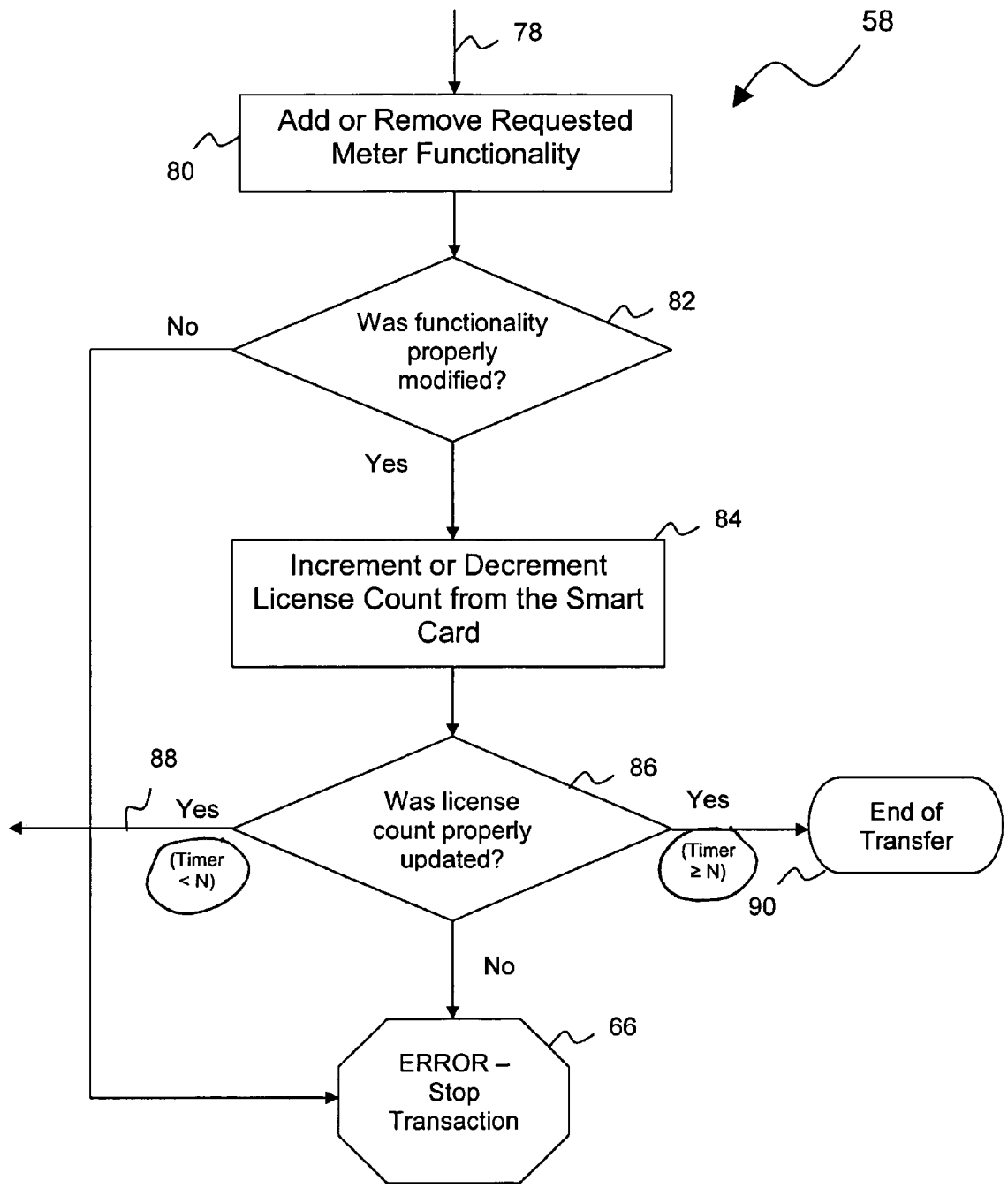

FIGS. 3, 4a and 4b concern more particular process steps associated with the general methodology of FIG. 2. As will be further understood from the following description, an external authentication process (as in FIG. 3) between a smartcard and peripheral computer provides for enhanced transaction security in accordance with the present subject matter. In addition, a random communication protocol for data transfer between a meter and peripheral computer will be presented with reference to FIGS. 4a and 4b.

It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features or steps may be interchanged with similar devices, features or steps not expressly mentioned which perform the same or similar function. Reference will now be made in detail to the presently preferred embodiments of the subject interactive utility system.

Referring now to the drawings, FIG. 1 represents an exemplary metering system 10 with interfaced smartcard features in accordance with the present subject matter. The basic platform of the disclosed technology is a metering apparatus 12, which provides hardware, software, and firmware components configured to measure or distribute a utility. Such utilities may correspond to a variety of different products or commodities including but not limited to water, gas, electricity, cable service, data transfer, telecommunication, and others.

Utility meter 12 typically includes hardware, software, and firmware necessary for a meter to function in a variety of different fashions. When a utility meter is sold to a utility company or other consumer, a meter is often programmed such that a selected set of metering features is initially enabled. After initial sale and installation of a utility meter, however, it may be desired to upgrade the functionality of the utility meter. In order for such alteration of the operational capabilities of a meter to occur, specific changes to the meter firmware must preferably be effected. Meter firmware is generally defined as the software stored in various memory chips or other components in the meter hardware that enables other software instructions and applications to be read and executed.

Changes to meter firmware in accordance with the present technology provide an ability to add, remove, or modify functional features of a utility meter. Such alteration may correspond simply to "unlocking" certain firmware portions already provided at a utility meter 12. Such firmware is typically stored in some sort of nonvolatile memory module in the meter, such as flash, EEPROM, EPROM, Ferro RAM, Shadow RAM, or battery-backed RAM. Alternatively, the firmware stored in such meter memory or portions thereof may be completely reconfigured when upgraded or downgraded features are to be established. Access to such firmware features in accordance with the subject technology is afforded via a functionality license purchased by a utility provider or other user.

Utility meter 12 typically comprises a plurality of communication ports to which peripheral devices can be connected for direct meter communication or such that RF devices can remotely communicate with the meter. Direct-connect communication ports that may be available at utility meter 12 include a serial port 14, a USB (Universal Serial Bus) port 16, and a PCMCIA (Personal Computer Memory Card International Association) port. Peripheral devices requiring this type of interface may be connected to utility meter 12 via cable connection to serial port 14, USB port 16, or a PCMCIA port. Utility meter 12 may also be provided with an optical port 18. A peripheral device may be provided in appropriate proximity to optical port 18 such that infrared (IR) communication between such peripheral device and the meter is enabled. Still further features that may be utilized in meter communications include a modem 20 and RF transceiver link 22.

It should be appreciated that any combination of the aforementioned communication ports may be utilized in accordance with disclosed technology. It should be further appreciated that specific aspects of such meter communication ports and other internal components of utility meter 12 should be within the purview of one of ordinary skill in the art. Thus, an additional description of such features and their corresponding functionality in exemplary utility meter system 10 is not presented herein.

With further reference to the exemplary metering system 10 of FIG. 1, a peripheral computer (PC) 24 is preferably configured to communicate with utility meter 12. PC 24 may communicate with meter 12 via any of the aforementioned communication ports. PC 12 may correspond to a laptop or handheld PC that can be utilized in the field by a service technician to communicate in relatively close proximity with the utility meter. Alternatively, PC 24 may correspond to a remote computer connected to a utility network that may communicate with meter 12 via modem 20 or RF transceiver link 22. PC 24 provides a platform for a software-based application that interfaces a user to the meter license transaction process.

Metering system 10 also includes a smartcard reader 26 that must be provided to interface with a smartcard utilized in the subject license transfer methodology. Smartcard reader 26 may be a separate peripheral device from PC 24, or may alternatively be an integrated component thereof. If smartcard reader 26 is a separate peripheral device from PC 24, then it may be connected to the PC via a USB or PCMCIA port or some other established wired or wireless connection.

A separate communication path may be provided between smartcard reader 26 and utility meter 12. If smartcard reader 26 is an integrated feature of PC 24, it may be possible to utilize a single communication path from PC 24 to utility meter 12. It should be further appreciated that additional modifications to the subject metering system could eliminate the need for PC 24, thus requiring only a single communication path for interfacing the smartcard reader with the utility meter.

Smartcard reader 26 preferably includes an interface 28, such as a multi-pin connector, for engaging in electrical contact with corresponding interface 30 of a smartcard 32. When smartcard 32 is engaged into smartcard reader 26, communication may then be enabled among smartcard 32, PC 24, and meter 12. Smartcard 32 preferably includes a memory module 34 for storing various files corresponding to meter licenses, security information, and transaction steps in accordance with the present subject matter. For security reasons, two external key files may be stored in memory module 34. A first key file may correspond to a factory transport key that provides security for the base file structure of memory module 34. A second key file may corresponds to a single key used to protect all smartcard license and log files. A microprocessor 36 is also included to process data transferred to and from smartcard 32. A license counter 38 is also preferably included in smartcard 32 such that the number of meter functionality licenses transferred to and from the meter may be properly monitored.

When smartcard 32 is properly engaged in smartcard reader 26 and effective communication connections exist between PC 24 and meter 12 as well as between smartcard reader 26 and meter 12, meter license transaction processes may properly ensue. If any of the physical connections or communication paths among the components of metering system 10 are jeopardized during the subject transaction methodology, then the transactions are preferably halted and error indications are provided either at PC 24 or at a visual display 40 provided at utility meter 12.

Now referring to FIG. 2, an exemplary transaction process 42 for enabling or disabling enhanced utility meter functionality includes a series of exemplary steps. A first step 44 of such process includes engaging smartcard 32 into smartcard reader 26 such that electrical contact and communication between the devices is enabled. Another aspect of initial step 44 is to activate the PC-based license transfer application installed on PC 24. Once the PC-based application is activated, the meter functions that are desired to be upgraded or downgraded can be selected by the user. A subsequent step 46 in the exemplary transaction process 42 of FIG. 2 involves performing an external authentication between smartcard 32 and PC 24. Exemplary substeps that may be implemented as part of the authentication step 46 are represented in FIG. 3.

A first step 48 in an exemplary authentication subroutine 46 involves PC 24 sending a PIN (Personal Identification Number) to smartcard 32. An example of a PIN is a four-digit string that is used to gain access to the smartcard. Such feature is included as part of the security measures typically utilized with smartcard technology, and may be combined with additional digital signature features or other security measures. A second step 50 in authentication sub routine 46 corresponds to PC 24 requesting a cryptogram, or encrypted random string of information, from smartcard 32. Smartcard 32 then sends a cryptogram in step 52 to PC 24, at which point the PC decrypts the cryptogram in step 54, by utilizing Data Encryption Standards (DES) protocol. A final step 56 then corresponds to smartcard 32 verifying that the PC properly decrypted the cryptogram. If proper decryption does not occur after three attempts (or another defined number of attempts), then smartcard 32 may become locked such that no further transactions may occur.

Referring again to FIG. 2, proper completion of authentication step 46 enables the transaction process to proceed to step 58, which involves communication between PC 24 and meter 12 to transfer the desired meter functionality. PC 24 may interrogate meter 12 to determine what type of meter is present in meter system 10, what type of features are currently enabled/disabled at meter 12, and/or what additional features may be potentially upgraded to or downgraded from meter 12. At that point, a randomized communication protocol is initiated between the meter and PC that helps to deter the theft of licenses during an upgrade or downgrade transaction. Such randomized communication protocol also helps to prevent a user from accidentally losing or gaining licenses as a result of lost connection or provision of power to the meter. An upgrade is performed when a user desires to add functionality to a meter, and involves using (spending) a license on a smartcard. A downgrade is performed when a user desires to remove functionality from a meter, and involves getting back (refunding) a license to a smartcard.

Step 58 of transferring meter functionality between meter PC 24 and meter 12 may in some embodiments of the disclosed methodology include more particular process steps. The steps of FIG. 4a and the steps of FIG. 4b combine to form a particular exemplary embodiment of communication step 58.

With particular reference to FIGS. 4a and 4b, a first step in communication subroutine 58 corresponds to step 60 of setting a timer to 0 seconds or some other beginning threshold time. Assuming that there are transactions to be performed, communication subroutine 58 proceeds to step 62, where the timer started in step 60 is monitored to determine if more than N seconds have passed. N is a defined number (for example, five seconds) that is established as a safeguard to the appropriate duration of the communication subroutine. By ensuring that every transaction takes at least N seconds to perform, the potential for a user to capture and decipher data flow between the meter and smartcard is reduced. Many steps must occur within that established time duration, including updating the meter and smartcard as well as implementing any number of random data reads.

If more than N seconds have passed, then communication subroutine proceeds to step 64, where it is determined if the inserted smartcard has the proper number of licenses in order to perform the desired transaction. If the smartcard does not have a proper number of licenses for the transaction, then the communication subroutine proceeds to step 66. Step 66 is representative of an error having occurred during the transaction process and thus the transaction process is halted. Errors can occur when a smartcard does not have a proper license count for the desired transaction or when data retrieval does not properly occur. Errors might also occur when no smartcard is detected or when a smartcard reader is not installed. In general, if an error occurs at any time during communication subroutine 58, the subroutine proceeds to step 66 and the transaction process is stopped.

Referring again to step 62 of FIG. 4*a*, assume that more than N seconds have not passed. Communication subroutine 58 then proceeds to step 68 where a first random number M (for example, M being an integer between 1 and 4 inclusive) is generated. This random number M is indicative of what action is to be taken next. Such defined action may correspond to the actual transferred updating of the smartcard and meter or to a random data read from the meter. By intermittently reading random data, it would be difficult for a user to capture the data stream communicated between the meter and smartcard to determine exactly when an update occurs. If a user cannot determine that exact time, then the potential for license theft is greatly reduced.

The randomly chosen value for M determines what step in the communication subroutine occurs next. It should be appreciated that the following random steps may be combined in any particular order and the exemplary order presented herein should not insinuate limitations of the subject technology. If M=1 and the utility meter and smartcard have not been updated, then subroutine 58 proceeds to step 64. If M=2, then subroutine 58 proceeds to step 70 to retrieve the smartcard serial number, and then continues to step 76. If M=3, then subroutine 58 proceeds to step 72 to retrieve the smartcard version number, and then continues to step 76. If M=4, subroutine 58 proceeds to step 74 to retrieve the smartcard license list, and then continues to step 76. If an error occurs at any time during the data retrieval of steps 70, 72 or 74, then instead of proceeding to step 76, the communication subroutine is routed to step 66.

Continuing with the exemplary communication subroutine 58 in FIG. 4*a* and assuming successful completion of step 70, 72 or 74, step 76 then involves the actual random data retrieval. Data is retrieved from the meter in step 76 based on a randomly generated number with range P. Exemplary values for number P correspond to an integer in the range from 1 to 10,000. Each number preferably effects the retrieval of a different piece of data from the meter. After step 76, communication subroutine then returns to step 68. Eventually the subroutine proceeds from step 68 to step 64 where it is determined that a proper smartcard license count is present. Communication subroutine 58 then proceeds along path 78 to step 80 in FIG. 4B. The steps of communication subroutine 58 in FIG. 4*b* generally correspond to updating the meter and smartcard and ensuring that any user's attempt to steal a license by performing actions such as removing the smartcard or smartcard reader is detected either before or after the meter has been updated.

Step 80 involves adding or removing the requested meter functionality to the utility meter. A subsequent step 82 then determines if such functionality was properly modified. If it is determined in step 82 that the modification was proper, then subroutine 58 proceeds to step 84, and if not, then subroutine 58 proceeds to step 66. At step 84, the license count on the smartcard is modified. If a meter downgrade has occurred, one license for the specified functionality is added to the license count maintained on the smartcard, and if a meter upgrade has occurred, one license is subtracted from the license count maintained on the smartcard. A subsequent step 86 determines if the smartcard license count was properly updated in step 84. If any error occurred during updating step 84, then an attempt is made to reverse the action performed in step 80 and then the subroutine proceeds to step 66. If it is determined in step 86 that the updating step 84 is successful and the elapsed counter time is less than N seconds, then subroutine 58 proceeds along path 88 to step 68. If it is determined in step 86 that the updating step 84 is successful and the elapsed counter time is greater than or equal to N seconds, then subroutine 58 proceeds to step 90. An individual transaction is completed at step 90 and if there are more transactions to be performed, communication subroutine 58 returns to step 60.

Figure 5:
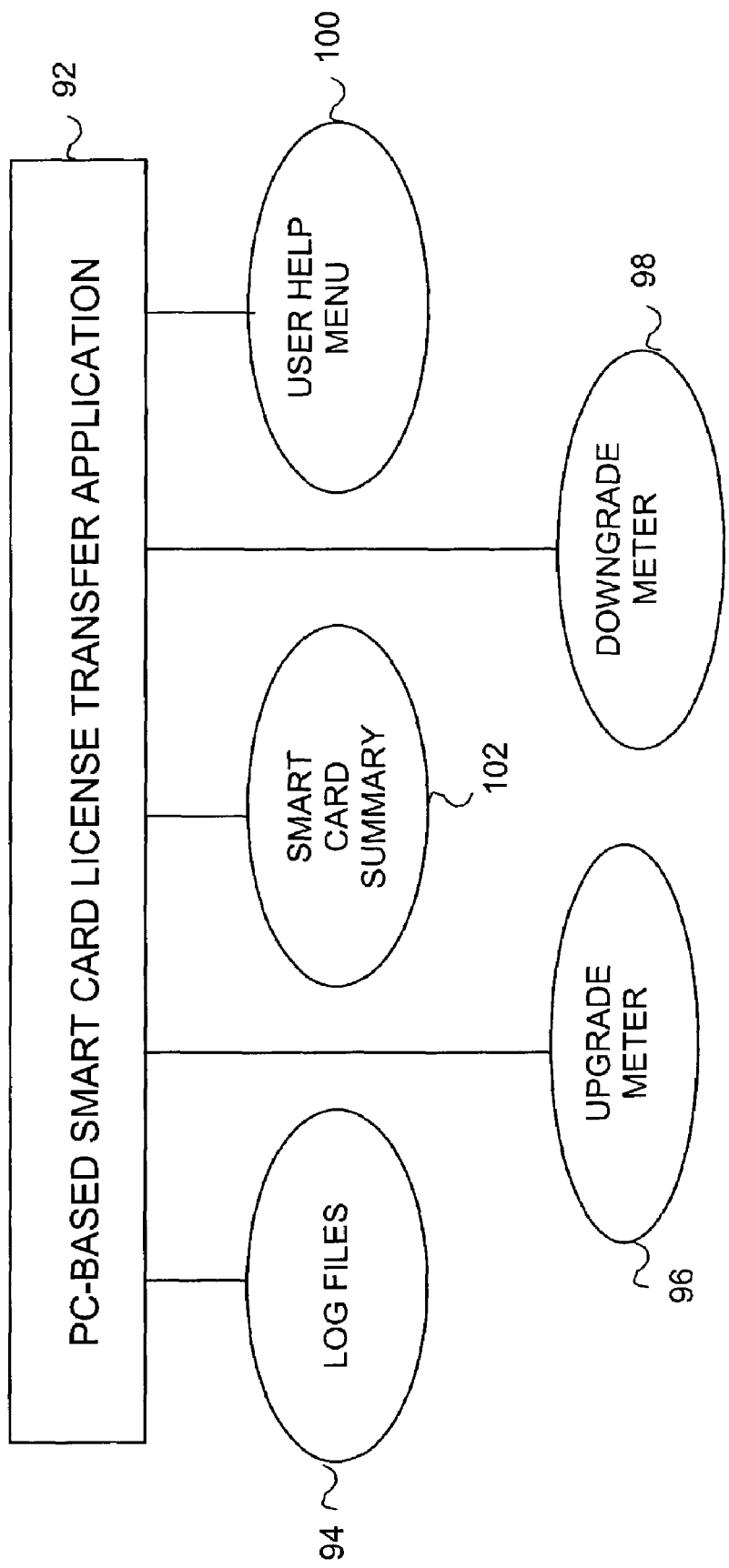
FIG. 5 provides a block diagram representation of a smartcard license transfer application and exemplary user-selectable features thereof in accordance with the present subject matter.

Aspects of the subject smartcard licensing technology and corresponding transaction methodology are enabled by a PC-based smartcard application installed on peripheral computer (PC) 24 of metering system 10. FIG. 5 provides a block diagram representation of exemplary user-selectable features in accordance with PC-based smartcard license transfer software application 92. Such application 90 is preferably capable of connecting to smartcard reader 26 and verifying features of smartcard 32. Application 90 also preferably provides user selection of the licensed functional features to be upgraded or downgraded and an ability to view and manage log files associated with the transaction process. The application may run on any desired operating system (e.g., Microsoft Windows) and is preferably able to cleanly recover from system power outages and system shutdowns.

There may often be a wide variety of functional meter features that can be upgraded or downgraded via the subject transaction methodology. Examples of some types of functional features include extended reactive power (kVAR) and/or apparent power (kVA) measurement capabilities, varied measurement levels, bi-directional measurement capabilities, per phase measurement capabilities, Time-of-Use (TOU) rate implementation, load profile implementation, power quality and/or voltage quality measurement capabilities, extended input/output (I/O) capabilities, GPS time synchronization capabilities, and international metering configuration capabilities. It should be appreciated that any existing or future-developed type of functional meter capability or metering aspect may be licensed and thus applied to the transaction technology disclosed in accordance with the present subject matter.

Application 92 may often interface with a plurality of different files utilized in accordance with the subject transaction process. Such files may be stored in the memory module 34 of smartcard 32 or on the hard drive or other memory component of PC 24. Such files might include an undeletable master file that is created when the smartcard is first built and that serves as the root directory of application 92. A carholder validation file on smartcard 32 can be used to hold a user's PIN. A serial number file can be used to contain a unique identifier for the smartcard. An external key file containing a DES encryption key may be used to authorize access to files in the associated directory. A smartcard version file may be a fixed length linear file that contains the version number of the application used to initially create the smartcard. This information may facilitate backward compatibility with other application versions. Separate smartcard license files may be included for each type of meter device. Each record in a license file can represent a single smartcard license.

When the user interface of application 92 is started, a user may preferably be able to connect to and logon to the target meter only after smartcard 32 has been inserted into smartcard reader 26. A logon dialog box is preferably provided in conjunction with application 92 such that information such as the type of communication connection (direct, wireless, etc.), the data transfer rate, the communication port number, and an optional security code can be provided for logging on. At that point, the user options in application 92 will be available on the application interface. Smartcard log file contents are preferably accessible via option 94 without the need to log onto the meter. This allows users to check the number of licenses on a particular card before going out into the field. These log files also store updated information reflecting any changes made to a meter via the subject smartcard application. A user help menu option 100 is preferably provided with application 92 at all times during the transaction process such that a user can get assistance with or additional information about the transaction process.

Depending on the configuration of the target meter, application 92 preferably provides a user with the option 96 of upgrading valid meter features or the option 98 of downgrading valid meter features. The displayed and selectable meter features that may be upgraded or downgraded will depend on the current meter's configuration and the available licenses on the smartcard. For example, there will not be an option to select a upgrade/downgrade feature if there is not a proper number of licenses on the smartcard.

If either option 96 or option 98 is selected from the application menu, a text field is preferably provided for a user to enter the meter serial number. Any text the user enters will be put in a log file so that the user has a way of uniquely identifying the meter being upgraded or downgraded. Log files may further include information such as smartcard serial number, meter serial number, meter type, unit ID, date and time of upgrades/downgrades, and list of upgrade/downgrade activity. This and other information may be provided in a conveniently accessible format via the selectable smartcard summary option 102 of application 92.

It should be appreciated that specific aspects of the PC-based application may readily vary with use of the disclosed smartcard technology while still falling within the spirit and scope of the present subject matter. Different software interfacing options and application features may be varied as within the purview of one of ordinary skill in the art and still apply to transferable meter licenses via smartcards.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of enabling via smart card transaction enhanced functionality for a utility meter used to monitor different types of utilities for products or commodities such as water, gas, electricity cable service or telecommunications, said method comprising the following steps: providing a smartcard reader interfaced with a utility meter and with a peripheral computer (PC); interrogating the utility meter to determine what type of meter is interfaced to the smartcard reader and to a PC associated with the PC-based application; engaging a smartcard into the smartcard reader and activating a PC-based transfer application on the PC; performing external authentication between the smartcard and the PC; communicating between the PC and the meter to enable selected enhanced functional meter features; and decrementing a license counter provided in conjunction with the smartcard.

2. A method as in claim 1, further comprising the step of selecting specific features to be added to the utility meter, wherein said selecting step occurs before said communicating step.

3. A method as in claim 1, wherein said performing step comprises the following substeps:
   (i) sending a PIN from the PC to the smartcard;
   (ii) sending a cryptogram from the smartcard to the PC;
   (iii) decrypting the cryptogram; and
   (iv) verifying proper decryption in step (iii).

4. A method as in claim 3, wherein the PC associated with the PC-based application performs substep (iii) and the smartcard performs substep (iv).

5. A method as in claim 3, wherein the cryptogram comprises an encrypted random data string.

6. A method as in claim 5, wherein said step of decrypting the cryptogram is implemented via Data Encryption Services (DES) protocols.

7. A method as in claim 2, wherein said communicating step comprises the following substeps:
   (i) starting a timer and monitoring the timer to ensure that the communicating step occurs within a predetermined amount of time;
   (ii) generating a first random number;
   (iii) retrieving selected smartcard information based on the first random number;
   (iv) generating a second random number;
   (v) retrieving data from the meter based on the second random number; and
   (vi) enabling the selected functional meter features to the utility meter.

8. A method as in claim 7, further comprising the step of verifying the enablement of features in substep (vi).

9. A method as in claim 7, further comprising the step of ensuring a proper license count at the smartcard.

10. A method as in claim 7, wherein if an error occurs during any portion of said communicating step, the transaction is halted.

11. A method of disabling enhanced utility meter functionality via smartcard transaction, said method comprising the following steps:
   providing a smartcard reader interfaced with a utility meter and with a peripheral computer (PC);
   interrogating the utility meter to determine what type of meter is interfaced to the smartcard reader and to a PC associated with the PC-based application;
   engaging a smartcard into the smartcard reader and activating a PC-based transfer application on the PC;
   performing external authentication between the smartcard and the PC;
   communicating between the PC and the meter to disable selected enhanced functional meter features; and
   incrementing a license counter provided in conjunction with the smartcard.

12. A method as in claim 11, further comprising the step of selecting specific features to be removed from the utility meter, wherein said selecting step occurs before said communicating step.

13. A method as in claim 11, wherein said performing step comprises the following substeps:
   (i) sending a PIN from the PC to the smartcard;
   (ii) sending a cryptogram from the smartcard to the PC;
   (iii) decrypting the cryptogram; and
   (iv) verifying proper decryption in substep (iii).

14. A method as in claim 13, wherein the PC associated with the PC-based application performs substep (iii) and the smartcard performs substep (iv).

15. A method as in claim 13, wherein the cryptogram comprises an encrypted random data string.

16. A method as in claim 15, wherein said step of decrypting the cryptogram is implemented via Data Encryption Services (DES) protocols.

17. A method as in claim 12, wherein said communicating step comprises the following substeps:
(i) starting a timer and monitoring the timer to ensure that the communicating step occurs within a predetermined amount of time;
(ii) generating a first random number;
(iii) retrieving selected smartcard information based on the first random number;
(iv) generating a second random number;
(v) retrieving data from the meter based on the second random number; and
(vi) disabling the selected functional meter features to the utility meter.

18. A method as in claim 16, further comprising the step of verifying the disablement of features in substep (vi).

19. A method as in claim 17, further comprising the step of ensuring a proper license count at the smartcard.

20. A method as in claim 17, wherein if an error occurs during any portion of said communicating step, the transaction is halted.

21. A method of utilizing a smartcard to transfer a functionality license to a utility meter, said method comprising the following steps:
interfacing a smartcard with a utility meter;
interrogating a license counter on the smartcard to ensure a proper license count exists before transferring the desired functionality;
providing a secure communication path between the smartcard and the utility meter; and
transferring information between the smartcard and the utility meter to enable or disable selected utility meter functions.

22. A method as in claim 21, wherein upgraded features are enabled at the utility meter and thus a proper license count corresponds to greater than or equal to one.

23. A method as in claim 22, further comprising the step of decrementing the license count on the smartcard.

24. A method as in claim 21, wherein features are disabled at the utility meter and thus a proper license count corresponds to one that is at least one less than the maximum count value.

25. A method as in claim 24, further comprising the step of incrementing the license count on the smartcard.

26. A method as in claim 21, wherein the smartcard is interfaced with the utility meter via a smartcard reader and peripheral computer combination in communication with a data port of the utility meter.

27. A method as in claim 26, wherein the utility meter data port comprises a port selected from the group consisting of a serial port, a USB port, a PCMCIA port, a modem port, an RF link, and an optical port.

28. A method as in claim 21, wherein said step of providing a secure communication path comprises transferring PIN information between the smartcard and an interfaced PC.

29. A smartcard for use with utility meter license transfers, said smartcard comprising: memory configured to store files with information corresponding to license transactions; a microprocessor configured to process data transferred to and from said smartcard, to interrogate the utility meter to determine what type of meter is interfaced to a smart card reader and to the microprocessor, and to communicate with the meter to enable selected enhanced functional meter features; a license counter configured to maintain a number of licenses available to be upgraded to or downgraded from selected utility meters; an interface port configured to connect and communicate with a smartcard reader; and an enclosure for housing said memory and said microprocessor in a modular configuration.

30. A smartcard as in claim 29, wherein said memory stores a file corresponding to the cardholder's PIN.

31. A smartcard as in claim 29, wherein said memory stores a file corresponding to a unique serial number identifier.

32. A smartcard as in claim 29, wherein said memory stores a file corresponding to each type of license capable of transfer to a utility meter.

33. A smartcard as in claim 29, wherein said memory stores respective information corresponding to the cardholder's PIN, a unique serial number identifier, and each type of license capable of transfer to a utility meter.

34. A smartcard as in claim 29, wherein said interface port comprises a multi-pin contact area for mating with a corresponding multi-pin contact area of a smartcard reader.

35. A smartcard as in claim 29, wherein said smartcard is capable of sending an encrypted data string to an interfaced PC.

36. A smartcard as in claim 35, wherein said smartcard is further capable of verifying proper decryption of the encrypted data string by the PC.

37. A metering system capable of providing upgraded or downgraded functionality, wherein the metering system functionality is enabled or disabled via meter functionality licenses, said metering system comprising: a metering apparatus for electronically measuring or distributing a utility product or commodity; at least one communications port provided in conjunction with said metering apparatus such that communication with processing components of the metering apparatus is enabled; a peripheral computer configured to communicate with said metering apparatus via said at least one communication port, and to interrogate said metering apparatus to determine what type of metering apparatus is interfaced to said communication port and to said peripheral computer; and a smartcard reader connected to and in communication with said peripheral computer, said smartcard reader configured to receive a smartcard such that meter system functionality can be enabled or disabled by communications from said peripheral computer to said metering device.

38. A metering system as in claim 37, wherein the utility product measured or distributed by said metering apparatus comprises electrical energy.

39. A metering system as in claim 37, wherein said at least one communication port is selected from the group consisting of a serial port, a USB port, a PCMCIA port, an RF link, a modem connection, and an optical port.

40. A metering system as in claim 37, further comprising an additional communication port such that direct communication between said metering apparatus and said smartcard reader is enabled.

41. A metering system as in claim 40, wherein each said communication port is selected from the group consisting of a serial port, a USB port, a PCMCIA port, an RF link, a modem connection, and an optical port.

42. A metering system as in claim 37, wherein said smartcard reader is an integrated component of said peripheral computer.

43. A metering system as in claim 37, further comprising a smartcard engaged in said smartcard reader, said smartcard containing meter functionality license information for enabling or disabling functionality of the metering apparatus.

44. A metering system as in claim 37, wherein said peripheral computer is outfitted with a software-based license transfer application with which a user can interact to effect functionality upgrading or downgrading.

45. A metering system as in claim 44, wherein the software-based license transfer application comprises user-selectable options including at least one selected from the group consisting of accessing log files, accessing a smart-card summary, upgrading meter functionality, downgrading meter functionality, and accessing a user help menu.

* * * * *